(12) United States Patent
Winter et al.

(10) Patent No.: US 6,420,998 B2
(45) Date of Patent: Jul. 16, 2002

(54) METHOD OF DETECTING AND CORRECTING NON-LINEARITIES IN A MICROWAVE RADAR SYSTEM

(75) Inventors: Klaus Winter, Schwieberdingen; Hermann Winner, Karlsruhe; Stephan Leinbaum, Oberriexingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/834,348

(22) Filed: Apr. 12, 2001

(30) Foreign Application Priority Data

Apr. 14, 2000 (DE) .......................... 100 18 553

(51) Int. Cl.[7] ................................ G01S 7/40
(52) U.S. Cl. ................ 342/174; 342/118; 342/128; 342/165; 342/173
(58) Field of Search .............. 342/82, 83, 84, 342/85, 86, 87, 88, 165, 166–175, 195, 200, 201, 202, 203, 204, 205, 109, 118–132; 327/1–17, 39–49; 702/108–126; 331/1 R, 17, 18, 19, 23, 25, 34, 44, 175, 176, 177 R

(56) References Cited

U.S. PATENT DOCUMENTS 3,735,402 A  * 5/1973  Mosher ...................... 342/109
4,123,719 A  * 10/1978  Hopwood et al. .............. 327/5
4,328,552 A  * 5/1982  Stovall ........................ 702/111
5,313,214 A  * 5/1994  Graziano et al. ........... 342/200
5,477,226 A  * 12/1995  Hager et al. ................ 342/120
5,694,132 A  * 12/1997  Johnson ...................... 342/200

FOREIGN PATENT DOCUMENTS

DE       197 13 967       10/1998
DE       10018552 A1  * 10/2001 ............. G01S/7/40
EP       0048170 A1  *  3/1982 ............ G01S/13/34

* cited by examiner

*Primary Examiner*—Bernarr E. Gregory
(74) *Attorney, Agent, or Firm*—Kenyon & Kenyon

(57) ABSTRACT

A method of detecting and compensating for non-linearities in a microwave radar system in which a transmitted signal, frequency modulated according to a predefined function, is generated using a transmit oscillator, and by mixing the transmitted signal with a received signal reflected by an object, a distance of the microwave radar system from the object is determined. In predefined time windows a predefined constant test control voltage is applied to the transmit oscillator instead of a control voltage effecting frequency modulation, preferably using a test ramp, the voltage/frequency characteristic of a module being updated during the time window in order to generate the function characteristic for frequency modulation taking into consideration the reference signal.

7 Claims, 2 Drawing Sheets

METHOD OF DETECTING AND CORRECTING NON-LINEARITIES IN A MICROWAVE RADAR SYSTEM

BACKGROUND INFORMATION

German Patent No. 197 13 967, for example, describes a system for measuring distances in the surrounding area of motor vehicles having a FMCW microwave radar sensor (FMCW=Frequency Modulated Continuous Wave). This radar sensor has, as essential elements, a transmit oscillator, a mixer, and an antenna system for transmitting and receiving radar beams reflected by an object. The transmitted signal is frequency modulated with a predefined ramp function, for example, so that a frequency of the transmitted signal modified in the meantime by the modulation ramp is present due to the propagation time of the received reflected signal, and this frequency difference is a measure for the distance measurement.

The linearity of the above-mentioned ramp function, i.e., of the transmitted frequency ramp, is of decisive importance for the accuracy of measurement, the resolution, and the sensitivity of the FMCW microwave radar. In order to ensure that a linear frequency ramp is produced for modulation, the known device also has a reference oscillator whose output signal is mixed with the transmitted signal directly in the radar sensor simultaneously with the actual distance measurement. A reference quantity can be obtained by demodulating this signal, the reference quantity containing any non-linearities in the transmitted branch of the radar sensor, which can thus be taken into account accordingly in the analysis.

In conventional microwave radar systems, frequency regulation is also used (FLL or PLL control circuits) to achieve sufficiently good linearities of the frequency ramp; this regulation is implemented using appropriate additional, usually expensive, circuit resources. Such a frequency regulation and the respective hardware circuit components must be continuously monitored in operation for proper functioning, since a faulty response in the frequency regulating circuits results in modulation with insufficiently linear frequency ramps.

Although using the known devices it is possible to perform real time frequency regulation to the desired modulation frequency with correction of non-linearities, this involves relatively high circuit costs.

SUMMARY OF THE INVENTION

The present invention is based on the above-mentioned method of detecting and correcting non-linearities in a microwave radar system in which a transmitted signal, frequency modulated according to a predefined function, is generated using a transmit oscillator, and by mixing the transmitted signal with a received signal reflected by an object, a distance of the microwave radar system from the object is determined. According to the present invention, in predefined time windows a predefined constant test control voltage or a sequential series of such voltages is sent to the transmit oscillator instead of a control voltage effecting frequency modulation, provided in normal measuring cycles.

The reference signal determined for the respective constant test control voltage which should correspond to a frequency value of the transmit oscillator can now be used for correcting the characteristic curve for frequency modulation and thus for compensating for non-linearities in a simple manner. Thus, in principle the present invention can be summarized as measuring the voltage/frequency characteristic of the transmit oscillator operating in the mm wavelength range using a test function.

Test control of the oscillator is achieved using the constant control voltage which is applied to the transmit oscillator (VCO) for the predefined time window. The test voltage is converted into a transmitted frequency in the transmit oscillator and the transmitted frequency is mixed with the frequency of a reference oscillator (DRO), for example, with its sixth harmonic. The mixed frequency is then proportional to the emitted oscillator frequency, the frequency of the reference oscillator being selected so that the mixed frequency is in the range of <1 GHz.

For the usual type of ramp as a modulation function for the transmit oscillator, a ramp function which is appropriately pre-distorted in the voltage range is then generated from the measurement results; this ramp function takes into account and compensates for the non-linearities of the voltage/frequency characteristic of the transmit oscillator. These non-linearities may be caused, for example, by a non-linear frequency ramp in normal operation due to a fault of the ramp generator or of a regulating circuit (PLL or FLL), or also by a malfunction of a reference oscillator (DRO) or a defective U/f conversion by the transmit oscillator (GUNN oscillator).

According to a preferred embodiment, the method according to the present invention is performed using a stepped test ramp, whose individual steps form time window $\Delta t$ each with test control voltages of different magnitudes and whose steps each have a predefined deviation, which may also be constant. The actual frequency value of the transmit oscillator is then determined at each step.

This linearity test is performed cyclically during the operation of the microwave radar system, for example, once a second. Advantageously, after a predefined number of measuring cycles, preferably in every 10th measuring cycle and once at the time of the initialization of the microwave radar, the stepped test ramp is advantageously applied to the transmit oscillator and is subsequently evaluated so that the difference of the deviations of the frequency values with respect to the deviations of the test ramp is determined from the measured frequency values. The absolute values of the deviation differences of adjacent steps are added up and the sum is compared to an error-threshold.

In order to keep the memory requirements necessary for the above-mentioned calculation low, a linearity indicator $\delta$, determined by successive summations of the deviation differences, is formed. For this purpose, the transmit oscillator is stepped up in constant steps from the lowest possible frequency over the entire control range, whereby ideally a stepped curve with a constant deviation is obtained for the intermediary frequency. In the following step, the absolute value of the deviation difference $|\Delta Hub|$ from step n to step n−1 is formed for a total number of k steps and subsequently added up over all deviation differences. The following equation is thus obtained for linearity indicator $\delta$:

$$\delta = \sum_{n=1}^{k-1} |\Delta Hub_{n+1} - \Delta Hub_n| \tag{1}$$

where $$Hub_n = f_{stufe(n)} - f_{stufe(n-1)} \tag{2}$$

The frequency of the reference signal obtained by mixing can be subdivided according to an advantageous embodiment using a frequency divider until it can be measured during the predefined time window with sufficient accuracy. A direct correspondence is thus obtained between the value of the test voltage applied and the oscillator frequency.

The present invention advantageously makes it possible to update the voltage/frequency characteristic of the module during the above-mentioned time window in order to generate the function for frequency modulation taking into consideration the reference signal, and to use the updated voltage/frequency characteristic for frequency modulation of the transmit oscillator outside the time window during operation of the microwave radar system. Thus the entire voltage/frequency characteristic can be determined or updated in a simple manner by varying the test control voltage in consecutive time windows if it has changed, for example, due to temperature influences. Subsequently the characteristic thus determined can be taken into account in generating a modulation ramp for the variation of the control voltage in normal operation, so that a linear frequency ramp is transmitted by the microwave radar as a result.

Overall, the method according to the present invention allows for a cost-effective design of a microwave radar system having the required frequency regulating components, since the voltage/frequency characteristic can be updated, i.e. corrected, via control commands integrated in a software program for ramp generation in order to modulate frequency without any additional circuit components. Furthermore, the proposed method is relatively insensitive to fluctuations in the values of the control electronics components in addition to being easily adjusted to new operating conditions.

DETAILED DESCRIPTION

Figure 1:
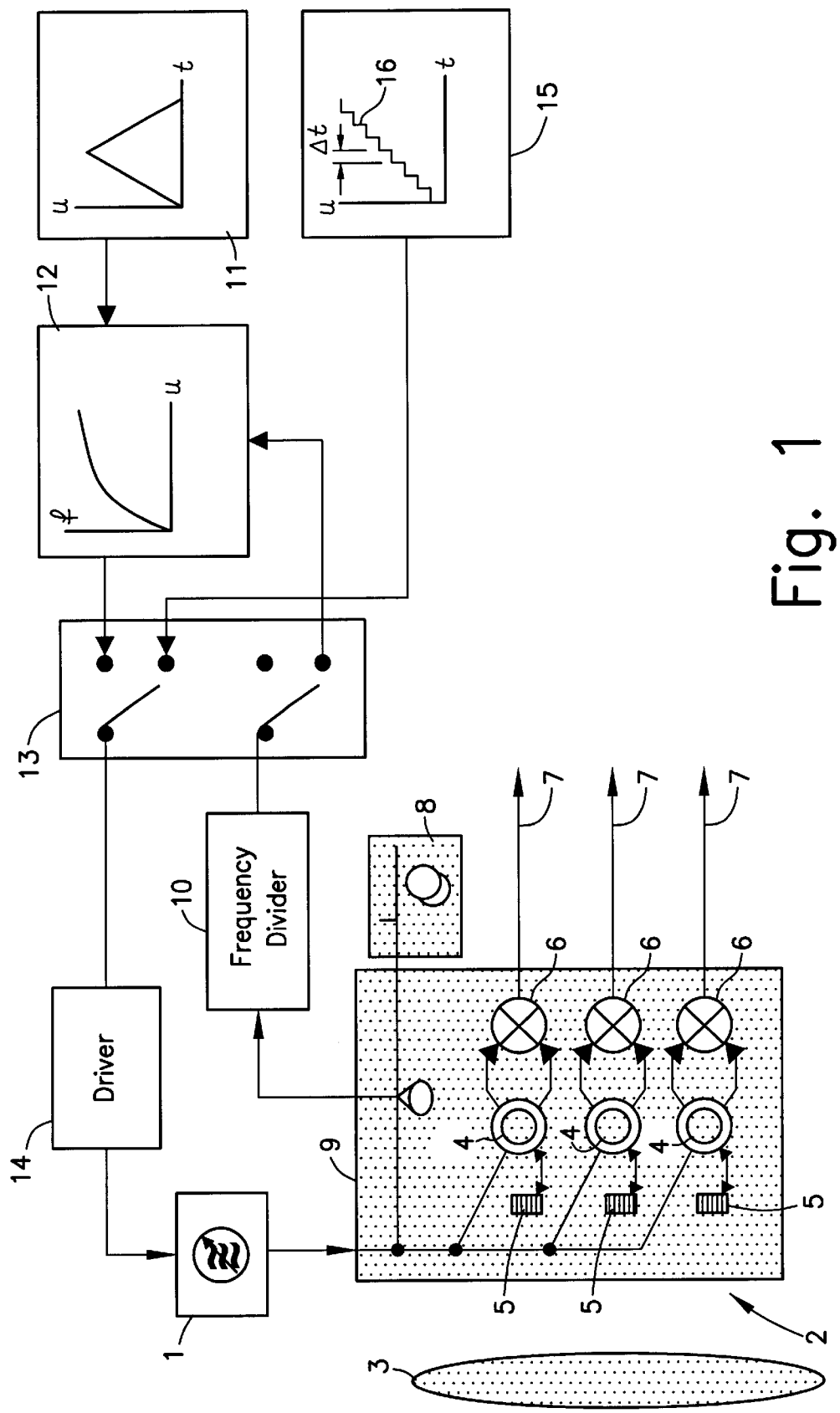
FIG. 1 shows a block diagram of circuit and function components of a microwave radar system having a test ramp for a linearity test.

FIG. 1 shows a block diagram with the elements that are important for the present invention of an FMCW microwave radar system. A voltage-controlled transmit oscillator 1 (GUNN VCO) in the frequency range of 76.5 GHz, for example, is provided, whose output signal is sent to a transceiver module 2. This transceiver module 2 having an upstream lens 3 can be a component of a radar sensor in a motor vehicle, for example, with which the distance to an object such as a vehicle traveling ahead, for example, is to be determined.

The transmitted signal is sent in transceiver module 2 to three antennas 5 in this embodiment via coupling modules 4 for lateral detection of an object, and the received signal reflected by the object is mixed in a mixer 6 with transmitted signal $f_{GUNN}$, and the mixed signal at outputs 7 is used in the manner described in the preamble for distance measurement. A reference oscillator (DRO) 8 is also present, whose output signal is gated with transmitted signal $f_{GUNN}$ resulting in an intermediate frequency signal $f_{ZF}$. There is also a mixer module 9, whose output signal is passed through a frequency divider 10, resulting in a reference signal which is explained in more detail below. The signals are gated in module 2 in the way typically used in microwave technology.

In the normal operating state, a linear ramp signal u(t) is generated using a ramp generator 11; from this signal, a characteristic voltage/frequency curve f(u) can be derived in a module 12. The frequency of voltage-controlled transmit oscillator 1 can be modulated via a driver 14 according to the characteristic of module 12 via a control module 13 which is usually implemented in the software in the form of program control commands.

A test voltage generator 15 generates a predefined constant test control voltage, here a test ramp 16, in predefined time windows $\Delta t$ which is applied in these time windows $\Delta t$ to transmit oscillator 1 via control module 13.

The test signal delivered by frequency divider 10 in these time windows $\Delta t$, which corresponds to a certain frequency value of transmit oscillator 1, is now used for voltage/frequency characteristic correction in module 12 after passing through control module 13. Thus a voltage ramp, appropriately pre-distorted in the voltage range is generated from the test signals for the modulation function of transmit oscillator 1; this voltage ramp takes into account the non-linearity within the microwave radar system.

Figure 2:
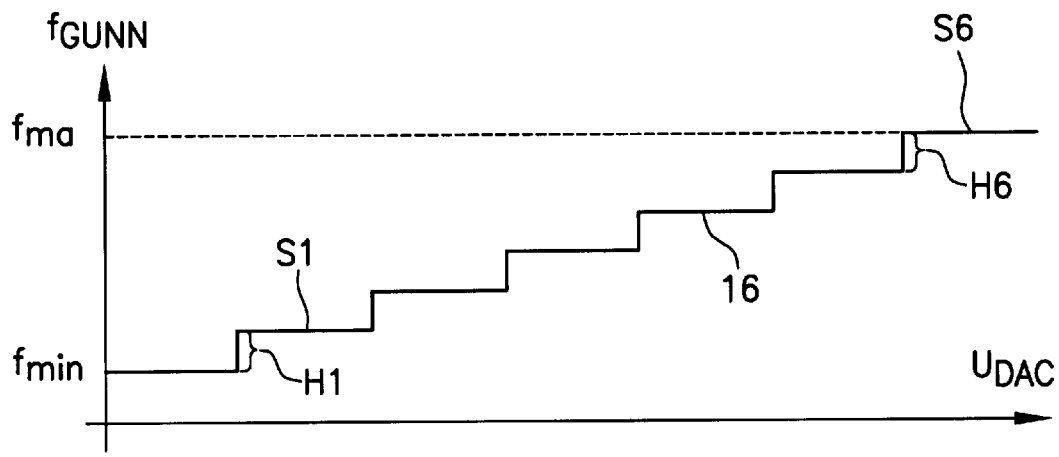
FIG. 2 shows a stepped curve of the test ramp for driving a transmit oscillator in the microwave radar system according to FIG. 1.

FIG. 2 shows the ideal frequency $f_{GUNN}$ of transmit oscillator 1 from $f_{min}$ to $f_{max}$ via a control voltage $U_{DAC}$ compared to test ramp 16 of test generator 15 and having steps S1 through S6 differing from one another by deviations H1 through H6. The sum of all deviation differences obtained from the equation for a linearity indicator $\delta$ according to Formula (1)

$$\delta = \sum_{n=1}^{k-L} |Hub_{n+1} - \Delta Hub_n|$$

where $$Hub_n = f_{stufe(n)} - f_{stufe(n-1)}$$

is then compared to the fixed maximum value $f_{max}$. If the maximum value $f_{max}$ is exceeded, this is evaluated as a positive error detection and the characteristic is corrected as described with reference to FIG. 1. Since frequency deviations H1 through H6 may not be accurately determined in a time window $\Delta t$, a minimum number of required difference counts per step frequency must be established in order to obtain a corresponding minimum accuracy in the deviation calculation and thus also in the calculation of the sum of all deviation differences. Furthermore, the total number of steps and the maximum sum of the deviation differences for which an error response should occur is to be taken into account.

Using a microprocessor-controlled electronic circuit arrangement which is known heretofore, the required step frequency can be determined from the measured signals. The number of level changes that occur in a certain direction (i.e., high-low or low-high) of the processor frequency within one period of the reference signal is determined with the help of an interrupt control (timer mode). Internally a counter is incremented with each level change and an interrupt makes it possible to read this count for each positive (or negative) edge of the reference signal. For a processor frequency of 28.5 MHz, this results in a $\Delta t$ of approximately ±70 ns. In order to minimize the error in calculating the step frequency, measurements can be performed over n periods instead of a single period and then the difference count can be divided correspondingly by n. Since the maximum error of ±1 occurs in the difference count even when measuring over n periods a maximum error of ±1/n is obtained by the subsequent division.

Figure 3:
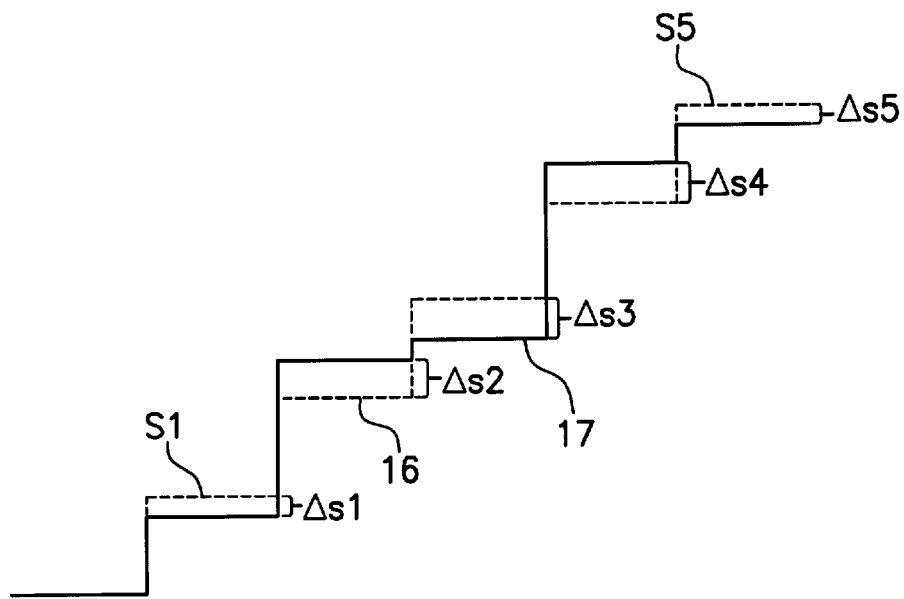
FIG. 3 shows the stepped curve measured for the linearity test in relation to the exact stepped curve.

FIG. 3 shows the exact stepped curve 16 having steps S1 through S5 as a dotted line and the measured stepped curve 17 as a solid line. The positive and negative deviations Δs1 through Δs5 are also shown for each deviation between steps S1 through S5. The systematic error for the linearity monitoring using the sum of the deviation differences is maximum when the calculated deviations have alternating maximum positive and maximum negative errors. This occurs when the errors in the step frequency calculation are alternately maximum positive and maximum negative as shown in FIG. 3. Thus in the worst-case scenario the following is obtained as the systematic error for linearity indicator δ:

$$\delta = (\Delta s1 + 2*\Delta s2 + \Delta s3) + (\Delta s2 + 2*\Delta s3 + \Delta s4) + (\Delta s3 + 2*\Delta s4 + \Delta s5) + \quad (3)$$

or $$\delta = \sum_{n=2}^{k-1} (\Delta s_{n-1} + 2*\Delta s_n + \Delta s_{n+1}) \quad (4)$$

or $$\delta = \Delta s_1 + 3*\Delta s_2 + 4*\sum_{n=3}^{k-2} \Delta s_n + 3*\Delta s_{k-1} + \Delta s_k \quad (5)$$

Taking into account the frequency values for step deviations Δs1 through Δs5, the required number n of steps can now be determined by simply substituting any desired maximum systematic error in this equation. For example, for a lower ramp frequency of approximately 400 MHz and a total deviation of approximately 200 MHz and a total of 10 steps for a maximum systematic error of 1 MHz, a minimum required n of 36 is obtained.

What is claimed is:

1. A method of detecting and correcting non-linearities in a microwave radar system, comprising:

generating a transmitted signal, frequency modulated according to a predefined function, using a transmit oscillator and by mixing the transmitted signal with a received signal reflected by an object;

determining a distance of the microwave radar system from the object;

testing linearity characteristics of the microwave radar system using a reference signal;

using test results for a correction;

in predefined time windows, applying a predefined constant test control voltage to the transmit oscillator instead of a control voltage effecting frequency modulation;

updating a voltage/frequency characteristic of a module during a time window in order to generate a function characteristic for frequency modulation taking into consideration the reference signal; and using the updated voltage/frequency characteristic for frequency modulation outside the time window during operation of the microwave radar system.

2. The method according to claim 1, further comprising:

using a stepped test ramp whose individual steps form the time window with test control voltages of different values and whose steps each have a predefined deviation;

determining a test signal at each step; and generating a corresponding frequency value of the transmit oscillator.

3. The method according to claim 2, further comprising:

adding up absolute values of deviation differences to form a sum; and comparing the sum to an error threshold.

4. The method according to claim 3, further comprising:

determining a linearity indicator by successive summations of the deviation differences.

5. The method according to claim 3, further comprising:

determining the deviation differences by evaluating a count of a microprocessor-controlled circuit arrangement, a minimum number of required difference counts per step frequency to achieve a minimum accuracy being determined.

6. The method according to claim 5, further comprising:

determining a step frequency from a total number of steps and a maximum sum of the deviation differences for which an error response should occur.

7. The method according to claim 6, further comprising:

performing a measurement over a plural number of periods in order to calculate the step frequency; and dividing a measured difference count by the number.

* * * * *